INVENTORS G. D. HAYNIE
P. E. ROSENFELD

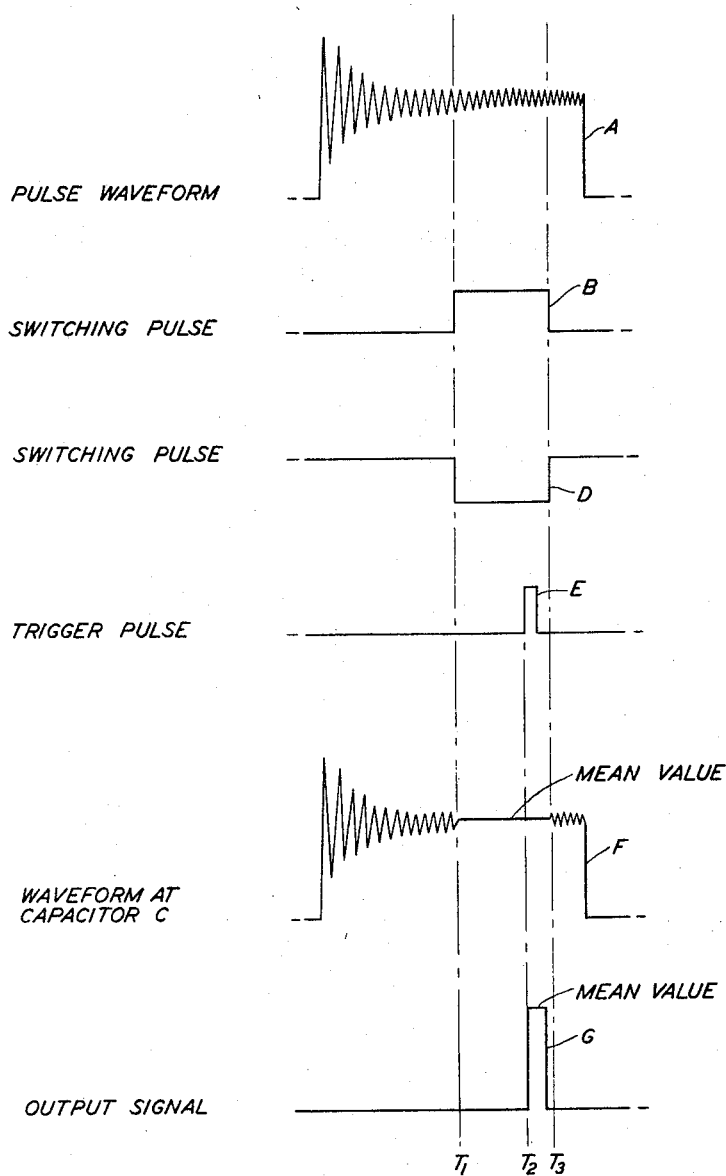

United States Patent Office 3,428,829
Patented Feb. 18, 1969

3,428,829
SIGNAL AMPLITUDE MEASURING SYSTEM
Gerald D. Haynie and Peter E. Rosenfeld, Berkeley Heights, N.J., assignors to Bell Telephone Laboratories, Incorporated, New York, N.Y., a corporation of New York
Filed Dec. 23, 1965, Ser. No. 516,032
U.S. Cl. 307—235            5 Claims
Int. Cl. H03k 5/20, 17/28; H03b 1/04

ABSTRACT OF THE DISCLOSURE

Accurate measurement of the amplitude of a pulsive signal, subject to transient fluctuations and random noise spikes, is made by selectively sampling a signal representative of the pulse which is developed across a storage element. Errors, possible because of the transient fluctuations, are minimized by initially charging the storage element through a circuit having a small value time constant. After the transients have subsided, the time constant of the circuit is altered to minimize possible errors because of the random noise. The pulse amplitude is sampled at a predetermined time after the alteration in the time constant of the circuit.

---

This invention pertains to signal amplitude measuring systems and, more particularly, to apparatus for determining the mean amplitude of a signal contaminated by random noise.

The determination of the mean value of a random process is of foremost importance in many communication and detection systems. Recent development of sophisticated statistical techniques for signal processing, especially in such fields as radar, has given new impetus to the search for simple and high powered analytical tools for extracting the mean value of a communication signal. Not without some justification, the search for more complex analytical tools has been directed to the more esoteric arts, to the exclusion of the more mundane but highly important standard engineering disciplines.

A particular discipline in point, is the art of signal measurement. Consider, for example, the techniques available for the measurement of the amplitude of pulses contaminated by random noise and subject to transient fluctuations in magnitude. A starightforward approach is to apply the pulses to be measured to a storage device and then sample the magnitude of the stored signal after a number of repetitive cycles. This technique, of course, makes no provision for the effect of the transients and the contamination random noise. As a further development of this art, filters have been interposed between the pulse source and the storage device to reduce the effect of the random noise perturbations. Unfortunately, the transients or noise "spikes" charge the storage device to a much greater, or lesser, value than the mean amplitude of the applied signal. The inherent time constant of the combined filter and storage device prevents a rapid return to the mean level. Of course, after a period of time, this effect will be dissipated. Quite often, however, the signal to be measured is of such short duration that one is not allowed the luxury and dissipating effect of time.

Another and more involved technique is to sample the amplitude of the signal repetitively in the short duration of time allowed. The samples are then averaged together to approximate the mean value of the signal. This technique involves such complex equipment as to be economically prohibitive.

It is, therefore, a principal object of this invention to determine the mean amplitude value of a signal accurately and economically.

Another object of this invention is to determine the mean amplitude value of a signal in a manner which substantially reduces the effect of contaminating random noise.

Yet another object of this invention is to determine the mean amplitude value of a pulse signal subject to initial transient fluctuations in magnitude and subject to the continuous presence of random noise.

Still another object of this invention is to optimally and efficiently reduce the effect of random noise perturbations in the measurement of the mean amplitude value of a pulse.

These and other objects of this invention are accomplished, in accordance with the present invention, by the utilization of a discrete form of filtering. A pulse signal to be measured is applied to a storage element via a circuit path which has a selectively variable impedance, thus forming in conjunction with the storage element, a circuit having an alterable time constant. The time constant of the circuit is first adjusted to a minimum value to allow rapid dissipation of the transient fluctuations. The time constant is then selectively adjusted to an optimum value to reduce the effect of the random noise contamination. More particularly, due to the small time constant, the magnitude of the signal appearing across the storage element is substantially identical to that of the applied pulse signal. Thus, transient signals appearing at the initiation of the pulse are also present at the storage element. However, due to the extremely small value of the time constant of the circuit, these transient signals at the storage element decrease in magnitude simultaneously with the collapse of the applied signal transients. At this point in time, the magnitude of the signal appearing at the storage element is substantially equal to the mean value of the pulse subject, of course, to random noise fluctuations. A resistor of a predetermined optimum value is then selectively inserted in the charging circuit path of the storage element. The time constant of the altered charging path is then such that the random noise fluctuations are substantially dissipated in a short period of time. The effectively "noiseless" signal at the storage element is thereupon sampled to develop an output pulse whose amplitude more accurately corresponds to the mean amplitude of the applied signal. The inserted resistor is then effectively removed from the charging path prior to the initiation of the next succeeding substantial alteration in magnitude of the applied signal. Thus, by the practice of this invention, a simple and inexpensive circuit, easily modified as necessity requires, is utilized to accurately determine the mean amplitude value of a signal subject to transient fluctuations in magnitude and contamination with random noise.

These and further features and objects of the present invention, its nature and various advantages will be more apparent upon a consideration of the attached drawings and of the following detailed description of the drawings.

In the drawings:

FIG. 3 is a composite set of waveforms of various signals occurring during typical operation of the present invention.

Figure 1:
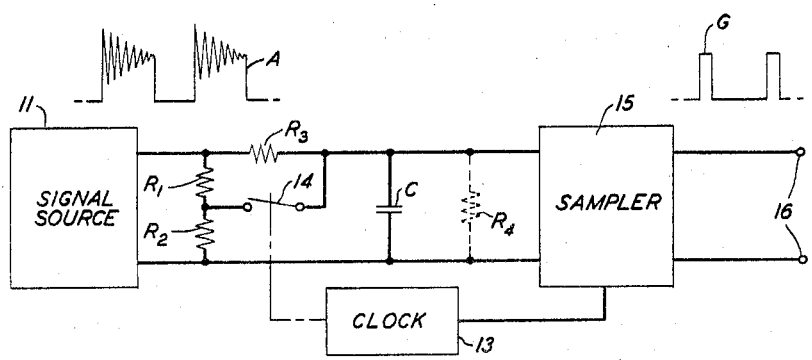
FIG. 1 is a schematic representation illustrating the mode of operation of the present invention.

Signal source 11 of FIG. 1, which may, for example, be any source of signals in a complex electrical configuration, generates a train of pulses; a typical pulse is identified as waveform A of FIG. 3. Although, ideally, the signal is a sharp clean pulse, very often each pulse is characterized by a sharp transient fluctuation in magnitude at the initiation of the pulse and by the continuous presence of contaminating random noise. It is therefore extremely difficult to obtain an accurate measurement of the pulse amplitude. In accordance with the inveniton, the pulses developed by source 11 appear across the series combination of resistors $R_1$ and $R_2$. At the initiation of each pulse, switch 14, which is operatively activated by clock 13, is in a closed position. The applied pulse appearing across resistors $R_1$ and $R_2$ is therefore applied via switch 14 to capacitor C. Since the time constant of the charging path is relatively small, i.e., R, C is small, the magnitude of the signal developed across the capacitor C substantially follows the magnitude of the applied pulse. After the transient has effectively collapsed, indicated at time $T_1$ in FIG. 3, a switching pulse, generated by clock 13, activates switch 14 and opens the shunt path around resistor $R_3$. Since the resistance value of $R_3$ is greater than that of $R_1$, the time constant of the resulting charging path is increased. As discussed hereafter, the time constant is selected to reduce optimally the effect of the contaminating random noise. A substantially noise free signal is thereby available for sampling, in accordance with the present invention, as indicated by waveform F of FIG. 3. After a predetermined period of time, clock 13 generates a trigger pulse, at time $T_2$, which activates sampler 15. Sampler 15 may be of any well-known type; either a gate circuit, or an analog to digital converter have been found to serve adequately. The voltage appearing across capacitor C is therefore sampled and a pulse of an amplitude corresponding to the mean value appears at output terminals 16 of sampler 15. A short period of time after the activation of sampler 15 a switching pulse, emanating from clock 13, activates switch 14 and closes the shunt path around resistor $R_3$. Periodically thereafter, the operation as described is repeated for each pulse waveform thereby generating at output terminals 16 a train of pulses whose amplitude corresponds to the mean value of the applied pulses. Clock 13 may be of any well-known type which may be selectively adjusted to generate a series of pulses at predetermined intervals.

As indicated by the waveforms of FIG. 3, it is essential that, upon the activation of switch 14, the direct current level of the signal appearing across capacitor C remain invariant. This would not be the case if it were not for the presence of resistors $R_1$ and $R_2$. As is well known by those skilled in the art, an active device has a predetermined input impedance. Resistor $R_4$, indicated by dashed lines, represents the input impedance of sampler 15. Assuming for the moment that the shunt path closed by switch 14 was directly connected across resistor $R_3$, and that resistors $R_1$ and $R_2$ were not present, the voltage divider action of resistors $R_3$ and $R_4$ would, upon the opening of switch 14, cause a reduction in the D.C. value of the signal appearing across capacitor C. It has been found, however, that the D.C. value of the signal appearing across capacitor C will remain substantially invariant if resistors $R_1$ and $R_2$ are utilized as shown, and the following condition is satisfied:

$$\frac{R_1}{R_2} = \frac{R_3}{R_4} \quad (1)$$

In addition to satisfying this condition, which maintains the value of the D.C. signal appearing across capacitor C invariant, the resistors are also selected to maintain the correct relationship between the time constants for the closed and open path charging periods of capacitor C. Generally, the resistance value of $R_3$ is much greater than that of $R_1$. This selection is greatly simplified by a Thevenin analysis of the circuit for the two operative conditions of switch 14.

A result not apparent from a straight forward operative consideration of the invention is inherent in the operation of the circuit of FIG. 1. It has been found that the means square noise reduction, X, obtained in accordance with the present invention may be expressed as:

$$X = \epsilon^{-2aT} + a\int_0^T \rho(u)\epsilon^{-au}du + a\epsilon^{-2aT}\int_0^T \rho(u)\epsilon^{au}du \quad (2)$$

where $\rho(u)$ is equal to the normalized autocorrelation function of the contaminating noise, T is equal to the time interval between the insertion of resistor $R_3$ and the sampling of the signal appearing across capacitor C, $a$ is equal to the reciprocal of the circuit time constant when $R_3$ is inserted in the charging path, and $\epsilon$ is equal to the base of the natural logarithm.

In one embodiment of the present invention the contaminating noise was considered to have been previously filtered by a resistance-capacitance network having a radian cutoff frequency equal to $b$. The normalized autocorrelation function, $\rho(u)$, is then easily shown to be equal to $\epsilon^{-bu}$. The mean square noise reduction obtained in accordance with the present invention may then be expressed as:

$$X = \epsilon^{-2aT} + \frac{a}{a+b}(1 - \epsilon^{-(a+b)T}) + \frac{a}{b-a}\epsilon^{-2aT}(1 - \epsilon^{(a-b)T}) \quad (3)$$

An optimum value for the time constant, $1/a$, may be determined by analytical or graphical techniques. It has been found, however, that the expression defined in Equation 3 may be approximated by the following:

$$X = \epsilon^{-2aT} + \frac{a}{b} \quad (4)$$

It should be noted that the ratio $a/b$ corresponds to the ratio of the cutoff frequency, i.e., the reciprocal of the time constant, of the discrete filter formed essentially by resistor $R_3$ and capacitor C of FIG. 1, and the cutoff frequency of the contaminating noise. An approximate optimum value for the time constant, $1/a$, of the discrete filter may be determined by differentiating the expression of Equation 4 with respect to the ratio $a/b$, setting the differentiated expression equal to zero, and solving for $1/a$. The optimum value for the time constant, $1/a$, of the discrete noise filter may then be shown to be:

$$\frac{1}{a} = \frac{2T}{\ln(2bT)} \quad (5)$$

Figure 2:
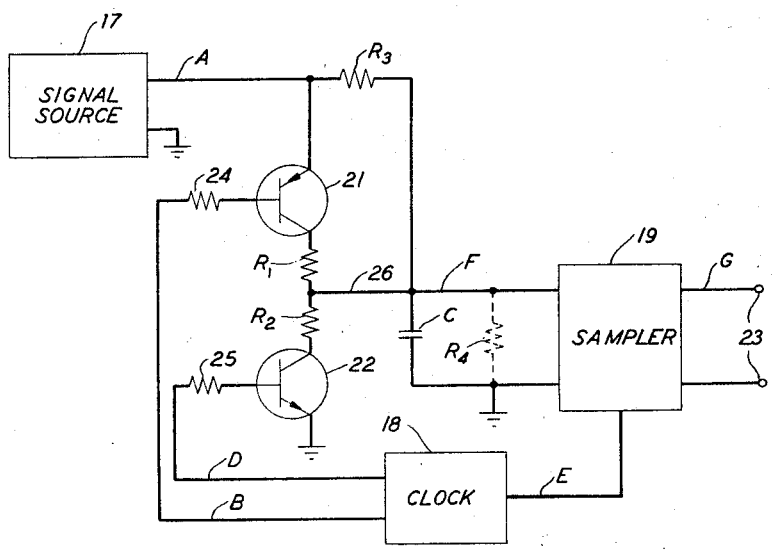
FIG. 2 is a schematic circuit diagram of an illustrative embodiment of the present invention.

The aforementioned features of this invention are advantageously turned to account in the illustrative circuit of FIG. 2. In this circuit, switch 14 of FIG. 1 has been replaced by transistors 21 and 22. The circuit operation is substantially similar to the circuit of FIG. 1. The train of pulses appearing at the output of signal source 17 is applied across the series combination of the collector-emitter paths of transistors 21 and 22 and resistors $R_1$ and $R_2$. After the initial transients of a pulse, represented by waveform A of FIG. 3, have collapsed, clock 18 develops a switching pulse, depicted as waveform B, which turns off transistor 21. Simultaneously, a switching pulse, waveform D, is developed by clock 18 which turns off transistor 22. Thus the path containing resistors $R_1$ and $R_2$ is open circuited and capacitor C is charged directly through resistor $R_3$. After a predetermined period of time, clock 18 develops a trigger pulse, waveform E at time $T_2$, which activates sampler 19. The voltage across capacitor C is therefore sampled to develop an output pulse, waveform G, whose amplitude accurately corresponds to the mean amplitude of the applied signal. This signal is available at output terminals 23. A short time after the generation of the trigger pulse, the switching pulses, waveforms B and D generated by clock 18, suffer a change in magnitude turning on transistors 21 and 22. Thus resistors $R_1$ and $R_2$ are directly connected across the output of source 17 and a shunting path exists across R₃ similar to that obtained when switch 14 of FIG. 1 is in a closed position.

It is to be understood that the embodiments shown and described herein are merely illustrative and that further modifications of this invention may be made by those skilled in the art without departing from the scope and spirit of the invention. For example, though the present disclosure has been primarily directed to the determination of the mean amplitude of a pulse, the invention may also be utilized to determine the mean value of any signal characterized by transient fluctuations occuring over a known time interval and random noise perturbations.

What is claimed is:

1. Apparatus for determining the mean amplitude value of a signal subject to transient fluctuations in magnitude and to contamination by random noise perturbations comprising:

signal storage means;

circuit path means for applying said signal to said storage means, said circuit path means including resistor means;

means for selectively shunting said resistor means effectively to remove said resistor means from said circuit path means, said resistor means being initially shunted;

means for initiating removal of said shunt from said resistor means at a predetermined time after initiation of transient fluctuations accompanying a substantial alteration in magnitude of said applied signal, said last-named means including means for initiating shunting of said resistor means before another substantial alteration in the magnitude of said signal; and means for sampling the magnitude of a signal developed across said storage means at a predetermined time after the removal of said shunt from said resistor means.

2. Apparatus for determining the mean amplitude of a signal comprising:

a source of a periodic train of pulses, each pulse characterized by initial transient fluctuations in magnitude and by the continuous presence of random noise perturbations;

signal storage means;

controllable circuit path means for applying said pulses to said signal storage means, said circuit path means and said storage means forming a circuit having a variable time constant;

means for selectively varying the time constant of said formed circuit, said last-named means including means for periodically initiating variation of said time constant between a preselected minimum value and a preselected optimum value, thereby to eliminate the effect of said transient fluctuations and said random noise perturbations of said pulses; and means for sampling the magnitude of a signal developed across said signal storage means at a predetermined time after said time constant has been varied from said minimum value to said optimum value.

3. Apparatus for determining the mean amplitude of a signal which comprises:

a source of a periodic train of pulses, each pulse characterized by initial transient fluctuations in magnitude and by continuous presence of random noise perturbations;

signal storage means;

circuit path means for applying said pulses to said storage means, said circuit path means including first resistor means, second resistor means, said first and said second resistor means connected in series circuit relationhip with said source of pulses, third resistor means connecting said source of pulses and said signal storage means, said circuit path means and said storage mean forming a circuit having a variable time constant;

means for periodically initiating variation of said time constant;

selectively operative switching means responsive to signals from said initiating means connected between a junction of said first and second resistor means and a junction of said third resistor means and said storage means for shunting said third resistor means with said first resistor means; and means for sampling the magnitude of a signal developed across said signal storage means at a predetermined time after said time constant has been varied.

4. Apparatus as defined in claim 3 wherein said sampling means has an input impedance of finite value and wherein a ratio of the resistive values of said first resistor means and said second resistor means is equal to the ratio of the reistive values of said third resistor means and said input impedance.

5. Apparatus for determining the mean amplitude of a signal which comprises:

a source of a periodic train of pulses, each pulse characterized by initial transient fluctuations in magnitude and by continuous presence of random noise perturbations;

signal storage means;

circuit path means for applying said pulses to said storage means, said circuit path means including first electronic switching means, second electronic switching means, first resistor means, second resistor means, said first and said second resistor means connected together in series circuit relationship between said first and said second electronic switching means, the combination of said first switching means, said first resistor means, said second resistor means, and said second electronic switching means connected in series circuit relationship with said source of pulses, third resistor means connecting said source of pulses and said signal storage means, and conduction means interconnecting a junction of said first and second resistor means with said storage means, said circuit path means and said storage means forming a circuit having a variable time constant;

means for periodically initiating variation of said time constant;

said first and said second switching means being responsive to signals from said initiating means; and means for sampling the magnitude of a signal developed across said signal storage means at a predetermined time after said time constant has been varied.

References Cited

UNITED STATES PATENTS 2,735,007   2/1956   McCurdy _____ 328—127 X
2,879,392   3/1959   Mudie _____ 328—181 X ARTHUR GAUSS, *Primary Examiner.*

JOHN ZAZWORSKY, *Assistant Examiner.*

U.S. Cl. X.R.

307—293; 328—151, 162; 324—111